United States Patent
Allen et al.

(10) Patent No.: US 9,242,648 B1
(45) Date of Patent: Jan. 26, 2016

(54) BOOSTING PARKING BRAKE DRIVE-THROUGH TORQUE

(71) Applicant: Caterpillar Inc., Peoria, IL (US)

(72) Inventors: William E. Allen, Peoria, IL (US);
Bryan T. Siegel, Brimfield, IL (US);
Norval Thomson, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/478,582

(22) Filed: Sep. 5, 2014

(51) Int. Cl.
*B60W 30/18* (2012.01)
*B60W 10/30* (2006.01)

(52) U.S. Cl.
CPC ......... *B60W 30/18027* (2013.01); *B60W 10/30* (2013.01); *B60W 30/18118* (2013.01); *B60W 2510/0604* (2013.01); *B60W 2510/1005* (2013.01); *B60W 2510/186* (2013.01); *B60W 2540/10* (2013.01); *B60W 2710/305* (2013.01)

(58) Field of Classification Search
USPC .......................................................... 701/36
See application file for complete search history.

(56) References Cited

U.S. PATENT DOCUMENTS

| | | | |
|---|---|---|---|
| 4,823,555 A | 4/1989 | Ohkumo | |
| 4,836,057 A * | 6/1989 | Asayama | F16D 48/062 477/120 |
| 6,299,263 B1 * | 10/2001 | Uematsu | B60K 31/00 303/123 |
| 7,347,168 B2 | 3/2008 | Reckels et al. | |
| 7,524,268 B2 * | 4/2009 | Oka | B60K 28/08 477/169 |
| 8,418,798 B2 * | 4/2013 | Mori | B60W 30/18063 180/307 |
| 2009/0318263 A1 * | 12/2009 | Yuet | B60T 7/16 477/92 |
| 2010/0131122 A1 * | 5/2010 | Dersjo | B60W 30/18 701/2 |
| 2011/0022276 A1 * | 1/2011 | Thaduvayi | B60K 6/46 701/48 |
| 2011/0146261 A1 | 6/2011 | Tevis et al. | |
| 2011/0202246 A1 * | 8/2011 | Lindsay | B60T 1/005 701/70 |
| 2011/0246031 A1 * | 10/2011 | Uematsu | B60K 17/35 701/50 |
| 2011/0257847 A1 * | 10/2011 | Uematsu | B60T 8/1769 701/48 |
| 2012/0330524 A1 * | 12/2012 | Rahman | B60T 7/042 701/70 |
| 2013/0332035 A1 * | 12/2013 | Shioiri | F02D 29/00 701/50 |

FOREIGN PATENT DOCUMENTS

JP  2004052584 A  2/2004

* cited by examiner

*Primary Examiner* — Hussein Elchanti
*Assistant Examiner* — Alex C Dunn
(74) *Attorney, Agent, or Firm* — Miller, Matthias & Hull LLP

(57) ABSTRACT

A system and method for enabling a machine to drive through its parking brake when in first gear include detecting that the machine transmission is in its lowest gear in a selected direction, that the machine parking brake is activated, such that the machine is stationary, and that the throttle setting of the machine exceeds a predetermined throttle threshold value. In this state, one or more auxiliary loads of the machine are dropped to provide additional torque to the ground engaging elements of the machine, such that there is sufficient torque to drive the machine through the parking brake.

20 Claims, 5 Drawing Sheets

BOOSTING PARKING BRAKE DRIVE-THROUGH TORQUE

FIELD OF THE DISCLOSURE

The present disclosure relates generally to earthmoving, industrial and agricultural machines (herein, "industrial machines" collectively) and, more particularly, to systems and methods for providing a parking brake system that is overridable in first gear while providing required holding power on a slope.

BACKGROUND OF THE DISCLOSURE

Industrial machines such as those used in construction and mining must often operate on uneven terrain. Not only must such machines be able to traverse, climb and descend steep slopes, but they must also be able to remain stationary on such terrain when appropriate. For example, according to one standard, the machine must be able to remain stationary on a predetermined grade while in second gear. For this reason, such machines are generally equipped with a parking brake that essentially locks the machine's wheels or other ground-engaging elements.

At the same time, for safety reasons, it is sometimes necessary for industrial machines to "drive through" the parking brake in first gear. In other words, when the parking brake is set and the machine is stationary, the operator should be able to force some movement of the machine in first gear, overriding the parking brake.

Thus, parking brakes for industrial machines need to be of sufficient holding power to serve their primary goal, i.e., that of holding the machine stationary, while not being so strong as to prevent the operator from moving the machine in first gear. As such, the maximum holding power of the parking brake is limited by the amount of propulsive torque available to drive through the parking brake in first gear.

An approach to this problem may be to weaken the parking brake until it has insufficient holding power to stop movement of the machine when in first gear under normal operation. However, in some circumstances, this will also yield a parking brake that is too weak to meet other holding power requirements. Similarly, providing a parking brake that is strong enough to meet other holding requirements, e.g., holding the machine stationary in second gear while on a predetermined grade, may yield a brake that cannot be overridden in first gear.

The present disclosure is directed to a system and method that mitigate certain of the noted deficiencies. However, it should be appreciated that the solution of any existing problem is not a limitation on the scope of this disclosure or of the attached claims except to the extent expressly claimed. Additionally, this background section discusses observations made by the inventors; the inclusion of any observation in this section is not an indication that the observation represents known prior art.

SUMMARY OF THE DISCLOSURE

In accordance with one aspect of the present disclosure, a method is provided for enabling a machine to drive through a parking brake of the machine. The method entails detecting that a transmission of the machine is in a first gear, detecting that a parking brake of the machine is activated, such that the machine is stationary, and detecting that a throttle setting of the machine exceeds a predetermined throttle threshold value. In response to the detected gear, parking brake activation and throttle setting, power is withheld from one or more auxiliary loads of the machine to provide additional torque to ground engaging elements of the machine to allow the machine to drive through the parking brake.

In another embodiment, a parking brake system is provided for enabling a machine to drive through a parking brake of the machine. The parking brake system includes a parking brake sensor configured to detect activation of the parking brake, a throttle sensor configured to detect a position of a throttle input, a transmission sensor to detect a transmission gear, and a controller configured to selectively drop auxiliary loads of the machine based on the throttle position, transmission position, and parking brake actuation to provide additional torque to ground engaging elements of the machine to allow the machine to drive through the parking brake.

In yet another embodiment, a machine is provided having a parking brake, a throttle, a transmission having a lowest forward gear and a lowest reverse gear, and a controller configured to detect a transmission gear, a throttle position, and a parking brake state, and to withhold power from one or more auxiliary loads of the machine upon detecting that the transmission is in one of the lowest forward gear and the lowest reverse gear, that the throttle position exceeds a predetermined threshold throttle position and that the parking brake is in an applied state.

DETAILED DESCRIPTION

Figure 1:
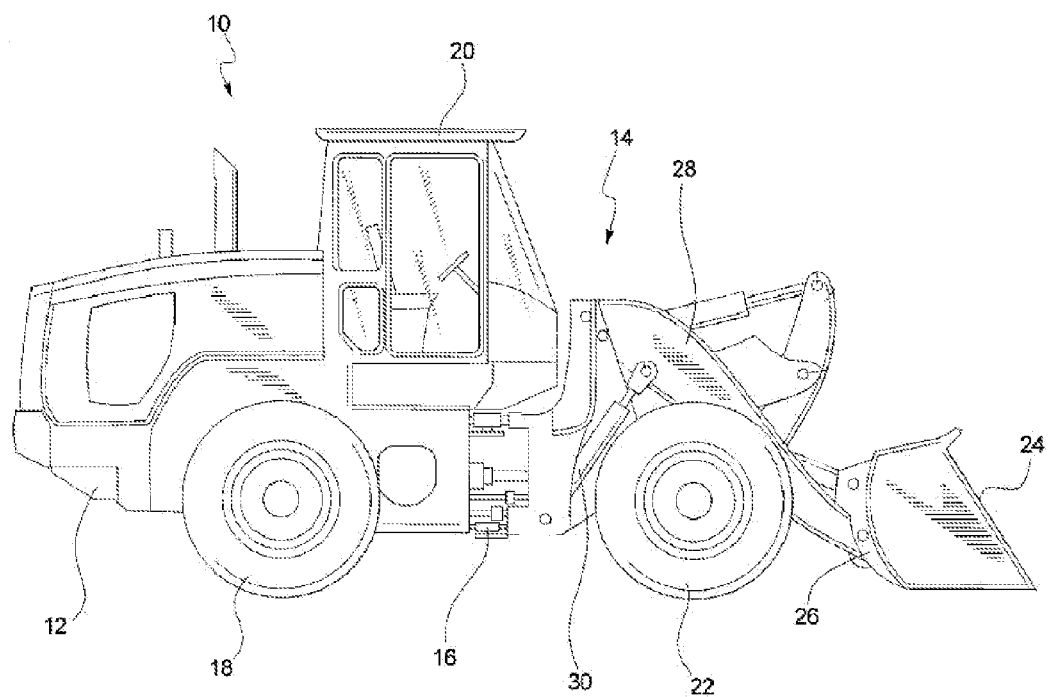
FIG. 1 is a side view of a wheel loader within which embodiments of the disclosed principles may be implemented.

In an embodiment shown in FIG. 1, a wheel loader 10 within which the disclosed principles may be implemented includes a body portion 12 and a non-engine end frame 14 connected by an articulating joint 16. The body portion 12 houses an engine that drives rear wheels 18, and includes an elevated cab 20 for the operator. The end frame 14 has front wheels 22 that are turned by the steering mechanism, with the articulating joint 16 allowing the end frame 14 to move from side-to-side to turn the wheel loader machine 10. In the illustrated embodiment, an implement in the form of a bucket 24 is mounted at the front of the end frame 14 on a coupler 26. The bucket 24 and coupler 26 may be configured for secure attachment of the bucket 24 during use of the wheel loader machine 10, and for release of the bucket 24 and substitution of another implement.

The coupler 26 is connected to the end frame 14 by a pair of lift arms 28. One end of each lift arm 28 is pivotally connected to the end frame 14 and the other end is pivotally connected to the coupler 26 proximate the bottom. The lift arms 28 rotate about the point of connection to the end frame 14, with the rotation of the lift arms 28 being controlled by corresponding lift cylinders 30 pivotally coupled to the end frame 14 and the lift arms 28. The lift cylinders 30 may be extended to raise the lift arms 28 and retracted to lower the lift arms 28. In typical implementations, two lift arms 28 are provided, with each having a corresponding lift cylinder 30. However, a single lift arm 28 and lift cylinder 30, two lift arms 28 driven by a single lift cylinder 30, or other arrangements of lift arms 28 and lift cylinders 30 providing similar functionality as kinematic elements may be used.

A parking brake system 40 of the wheel loader 10 will be discussed below in conjunction with FIG. 2, and is linked to one or more of the wheel loader engine, transmission (shown in FIG. 2), drive train and wheels 18, 22, and may brake both the front wheels 22 and the rear wheels 18, or may brake only one of the front wheels 22 and the rear wheels 18.

Figure 2:
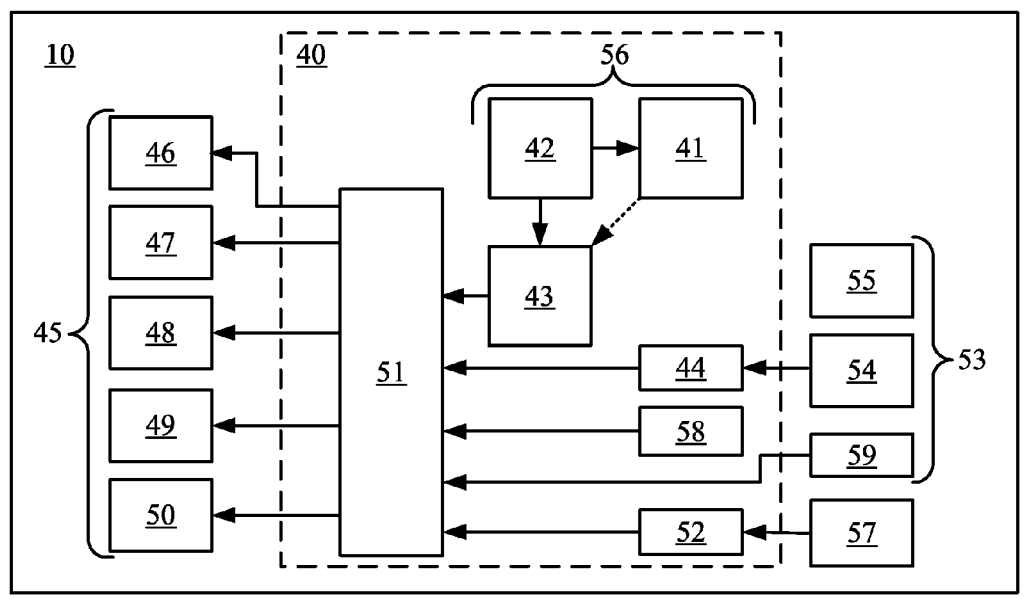
FIG. 2 is a schematic view of a parking brake system and environment in accordance with an embodiment of the disclosed principles.

The schematic diagram of FIG. 2 shows an example parking brake system 40 in greater detail. In the illustrated embodiment, the parking brake system 40 includes a parking brake 56 having a braking element 41, which may be a single or multi-disc brake disc brake assembly, a drum brake assembly or other suitable brake assembly. The parking brake 56 may be mechanically, electrically, hydraulically or pneumatically actuated. The parking brake 56 of the parking brake system 40 further includes an actuator 42 for actuating the braking element 41, e.g., an electrically actuated hydraulic or air solenoid valve, a mechanical actuator, or other suitable actuator.

A parking brake sensor 43 provides a signal indicative of the parking brake 56 being applied. The parking brake sensor 43 may be configured to detect an actuation signal or to detect movement at one or both of the braking element 41 and the actuator 42. Similarly, a transmission sensor 52 is configured to produce a signal indicative of a gear of the machine transmission 57 (referenced above in the discussion of FIG. 1 but not visible in the external view shown in that figure), e.g., to indicate each gear or to at least indicate when the transmission 57 is in first gear (the lowest available gear), whether in forward or reverse.

The transmission 57 may be of any suitable multi-gear configuration including, among others, purely mechanical configurations, electro-hydraulically actuated configurations, and electrically actuated configurations. The transmission 57 may provide multiple gears in both forward and reverse or may provide multiple forward gears but only a single reverse gear. For transmissions having only a single reverse gear, this single reverse gear is considered to be a first reverse gear for purposes of this disclosure.

The parking brake system 40 also includes a throttle sensor 44 configured to produce an indication of a position of a throttle (e.g., by measuring position of a throttle input 54, discussed in greater detail further below). For example, the throttle sensor 44 may detect the extent of throttle requested or applied, or may simply detect whether the commanded or actuated throttle position is beyond a predetermined threshold.

With respect to embodiments wherein machine pitch is taken into account in establishing dropped loads, the parking brake system 40 also includes a pitch sensor 58, sometimes referred to as a main fall sensor, which indicates a direction of steepest slope. The pitch sensor 58 may be a sensor used by the machine 10 generally or may be a dedicated sensor.

A transmission gear selector 59, e.g., positioned in the cab 20 of the machine 10, may be used by an operator of the machine to set a gear of the machine, e.g., between reverse, neutral, and one or more forward speeds. The position of the transmission gear selector 59, and thus the gear of the transmission 57, is monitored by the parking brake system 40 in an embodiment.

The machine 10 includes a number of auxiliary loads 45 which may also be referred to as parasitic loads. Such loads represent machine features and functions that require power when active (not dropped) but that may be deactivated or dropped at least momentarily without substantially impacting machine performance or condition negatively. Although these auxiliary loads 45 are not part of the parking brake system 40, the parking brake system 40 interfaces with these loads in a manner to be described herein with respect to machine behavior while the parking brake 56 is actuated. The illustrated loads include, for the sake of example, a cooling fan 46, an alternator 47 for charging the machine battery or directly providing electrical power, an air conditioner compressor 48, a hydraulic or pneumatic brake charging pump 49 and a machine water pump 50.

The illustrated embodiment of the parking brake system 40 further includes a controller 51, which may be a stand-alone controller or may be implemented within a multi-purpose controller, e.g., a machine controller, engine controller, or transmission controller. The controller 51 is electrically interfaced to one or more of the parking brake sensor 43, the transmission sensor 52 and the throttle sensor 44. In addition, the controller 51 is electrically interfaced to one or more of the cooling fan 46, the alternator 47, the air conditioner compressor 48, the hydraulic or pneumatic brake charging pump 49 and the machine water pump 50.

In an embodiment, the machine 10 also includes a user input device or operator interface 53. The operator interface 53 includes the throttle input 54 indicated above as well as a steering input 55 and the transmission selector 59 in the illustrated embodiment. Additional elements of the machine 10 that are not salient to the disclosed principles are omitted from the illustration for clarity. However, those of skill in the art will be familiar with the elements of various machines.

During operation of the machine 10, the controller 51 monitors certain aspects of the machine 10 that relate to parking brake 56 actuation and parking brake drive-through via the available sensors including for example the parking brake sensor 43, the transmission sensor 52 and the throttle sensor 44.

When the signals generated by the sensors indicate that the user is attempting to drive through the parking brake 56 in first gear, the controller 51 deactivates some or all of the auxiliary loads 45, increasing the available torque to the ground engaging elements of the machine 10, e.g., the front wheels 22 and rear wheels 18 in the illustrated example.

INDUSTRIAL APPLICABILITY

In general, the principles of the present disclosure find utility in various industrial applications, such as in earthmoving, industrial, construction and agricultural machines. In particular, the disclosed torque increasing system and method may be applied to excavators, wheel loaders, track-type tractors, motor graders, articulated trucks, pipe layers, backhoes, and the like. By applying the disclosed system and method to a machine, an operator is able to drive through the machine parking brake 56 in first gear, while still having sufficient slope-holding power in other gears.

According to one aspect, the controller 51 drops a fixed set of auxiliary loads when a user is attempting to drive through the parking brake 56 in first gear. In an alternative embodiment, the controller 51 determines a variance on the flat level machine operating condition and the torque increase required based on a current machine pitch and direction of travel, and derives a total torque increase required to drive through the first gear as the sum of the flat level torque increase and the pitch/direction-based variance.

In another embodiment, the controller 51 progressively drops loads. As an alternative to dropping a fixed set of loads at once, this embodiment allows for finer tuning of the additional torque provided. Likewise, as an alternative to dropping an entire predetermined set of loads, this embodiment eliminates the need to perform torque calculations and thus allows for a more rapid start to the torque adjustment.

Figure 3:
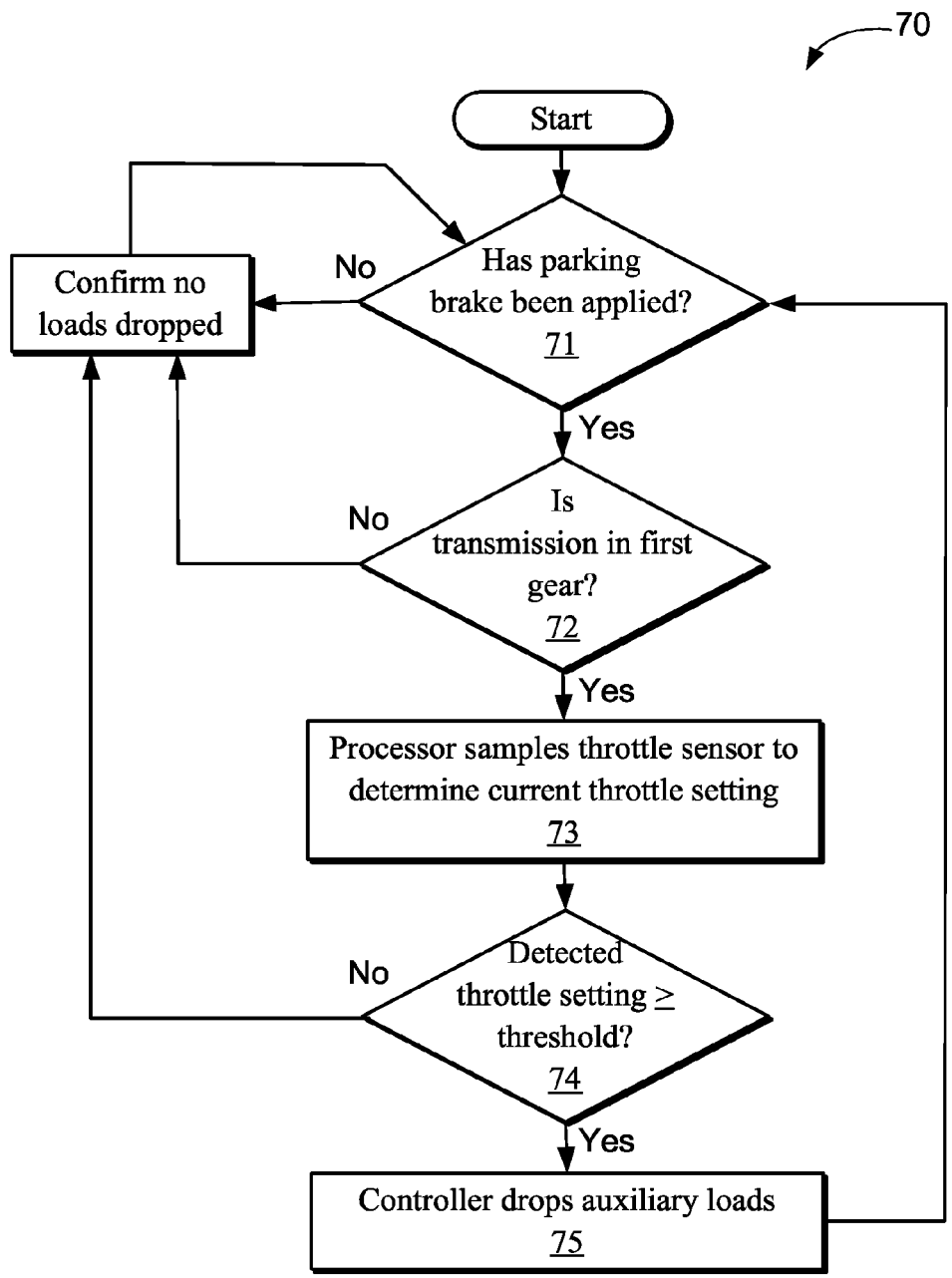
FIG. 3 is a flow chart showing a process for managing machine torque in conjunction with parking brake operation in accordance with an aspect of the disclosed principles.

With the foregoing summary as guidance, a detailed process 70 of machine operation with respect to parking brake 56 actuation and drive through is illustrated in the flow chart of FIG. 3. At stage 71 of the process 70, the controller 51 detects, e.g., via a sensor such as the parking brake sensor 43, whether the machine parking brake 56 has been applied (activated). If it is detected at stage 71 that the parking brake 56 has not been activated, then the process 70 loops at stage 71.

Otherwise, the process 70 flows to stage 72, wherein the processor 51 detects, e.g., via the transmission sensor 52, whether the transmission 57 is in first gear, whether in forward or reverse. If it is detected at stage 72 that the transmission 57 is not in first gear, then the process 70 loops back to stage 71.

Conversely, if it is detected at stage 72 that the transmission 57 has been placed in first gear, then the process 70 flows to stage 73, wherein the processor 51 samples the throttle sensor 44 to determine the current throttle setting, e.g., at the throttle element itself (e.g., throttle control valve) or at the user interface (e.g., throttle input 54).

The processor 51 compares the detected throttle setting to a predetermined threshold throttle setting at stage 74. If it is determined at stage 74 that the detected throttle setting does not meet or exceed the predetermined threshold throttle setting, then the process 70 returns to stage 71. Otherwise, if it is determined at stage 74 that the detected throttle setting does meet or exceed the predetermined threshold throttle setting, then the process 70 proceeds to stage 75.

At stage 75 of the process 70, the controller 51 increases the torque available to the machine ground engaging elements by dropping or deactivating one or more auxiliary loads, e.g., auxiliary loads 45 (cooling fan 46, alternator 47, air conditioner compressor 48, brake charging pump 49 and machine water pump 50). In an embodiment, an entire predetermined set of auxiliary loads are dropped at stage 75. In an alternative embodiment, only as many loads are dropped as are need to provide sufficient torque for the ground engaging elements to overcome the parking brake 56 as discussed in conjunction with FIG. 5 below.

In an embodiment, the controller 51 awaits expiration of a hysteresis period, e.g., 2 seconds, after dropping the auxiliary loads at stage 75 before proceeding back to stage 71 to confirm through stage 71 and the following stages that the additional torque is or is not still needed. In this way, an oscillation of the throttle input as it crosses the predetermined throttle threshold will not result in rapid oscillating deactivation and reactivation of the dropped loads.

As noted above, in an embodiment, the controller 51 may selectively drop one or more loads based on the extent to which the available torque to the ground engaging elements is less than is required for driving through the parking brake 56. For example, a wheel loader parked along the fall line of a slope, as opposed to across the fall line, will require less torque to drive through the parking brake 56 in the downhill direction, and will require more torque to drive through the parking brake 56 in the uphill direction. As the axis of the machine on the incline is changed away from the fall line and toward a cross-slope orientation, there will be a decreasing amount of direction-dependence in the torque required to drive through the parking brake 56 in first gear until the machine axis is perpendicular to the fall line.

Figure 4:
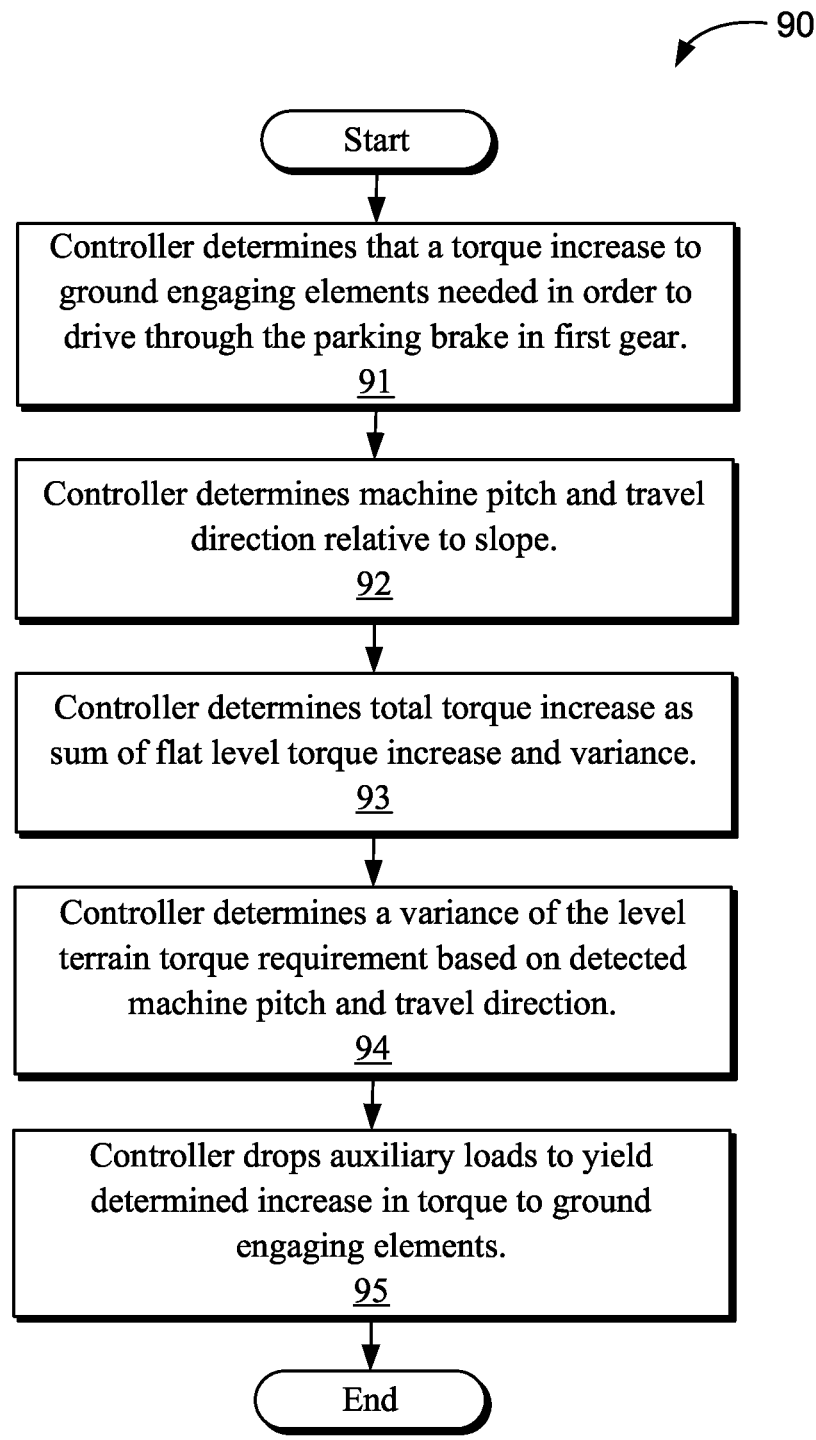
FIG. 4 is a flow chart showing a process for managing machine torque in conjunction with parking brake operation while accounting for machine pitch and direction in accordance with an aspect of the disclosed principles.

To accommodate the direction-dependence of the torque requirement when on a slope, the controller 51 modifies the dropping of loads based on the pitch of the machine as detected by the pitch sensor 58 in an embodiment of the disclosed principles. The flow chart of FIG. 4 illustrates such a process 90.

At the outset of the process 90, the controller 51 determines that a torque increase to the ground engaging elements is needed in order for the machine to be able to drive through the parking brake 56 (stage 91). This stage may entail the controller 51 executing a process such as the previously discussed process 70 that entails analyzing the machine throttle position, transmission selection and parking brake state to determine that the operator is attempting to drive through the parking brake 56 in first gear.

At stage 92 of the process 90, the controller 51 detects the current machine pitch as detected by the pitch sensor 58 and intended travel direction (based on gear direction). The controller 51 then determines, e.g., via calculation, or resolves, e.g., via a look up, a variance of the level terrain drive-through torque requirement based on the detected machine pitch and travel direction at stage 93. In particular, driving through the parking brake 56 in an uphill direction would require a greater amount of torque than driving through on level ground, whereas driving through the parking brake 56 in a downhill direction would require a lower amount of torque than driving through on level ground. Similarly, if the machine has a pitch of zero, then the torque increase will be the same regardless of intended travel direction (that is, there will be no variance).

Having determined the variance in torque needed to allow the operator to drive through the parking brake 56 in first gear, the controller calculates a total torque increase need at stage 94 and at stage 95 drops one or more auxiliary loads in order to make the total torque increase available to the ground-engaging elements As noted at the outset of this section, the controller may progressively drop loads in an alternative embodiment. This may largely eliminate the need to perform torque calculations, allowing for a more rapid start to the torque adjustment, and may allow for finer control of loads dropped since in most cases it will not be necessary to drop all auxiliary or parasitic loads.

Figure 5:
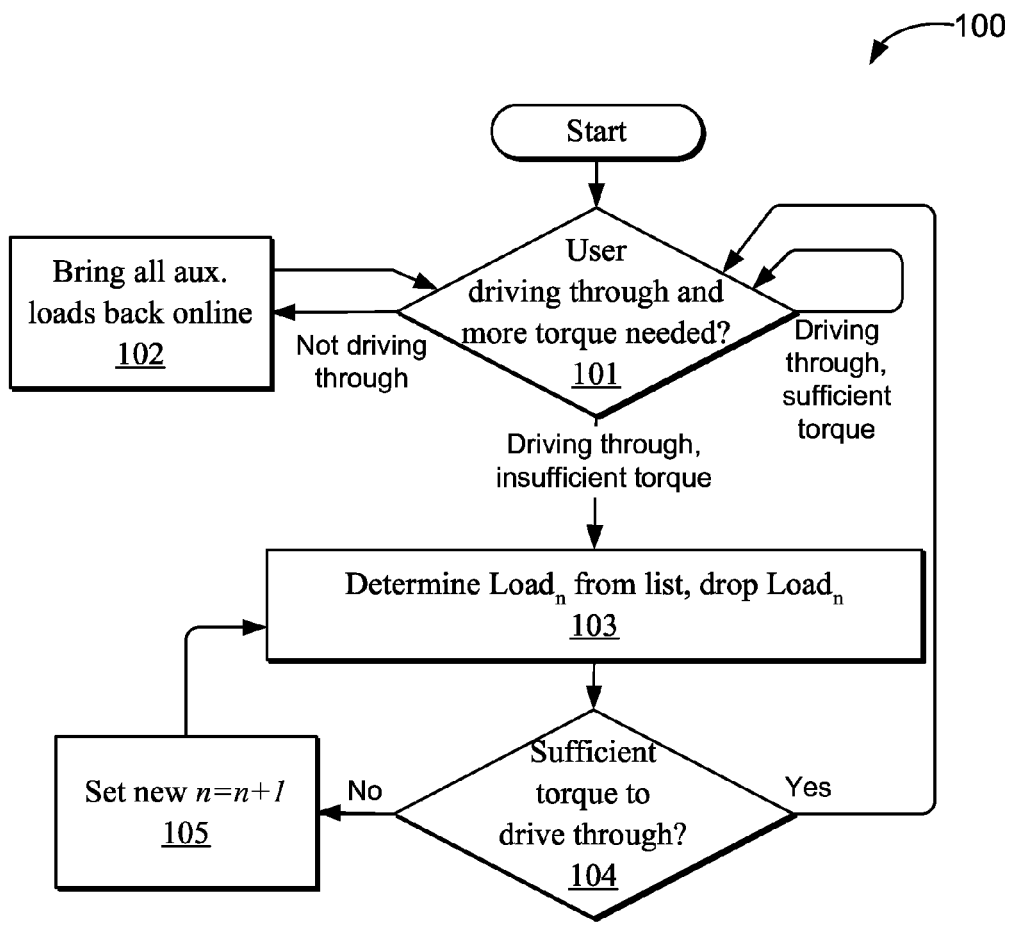
FIG. 5 is a flow chart showing a process for managing machine torque in conjunction with parking brake operation by successively dropping loads in a predetermined order in accordance with an aspect of the disclosed principles.

The process 100 shown in the flowchart of FIG. 5 allows the controller to rapidly begin increasing the torque to the ground engaging elements of a machine while not dropping any more loads than necessary to provide the needed drive through torque. At stage 101 of the process 100, the controller 51 determines whether a torque increase to the ground engaging elements is needed, that is, whether the operator is attempting to drive the machine through the parking brake 56 in first gear, and whether additional torque is needed. The extent to which a torque increase is needed may be based on the current incline underlying the machine 10, the extent to which the machine is aligned with that incline, and the direction of intended travel (i.e., is whether the transmission 57 is in the first forward gear or instead in the first reverse gear).

If it is determined at stage 101 that the operator is not attempting to drive the machine through the parking brake 56 in first gear such that no torque increase to the ground engaging elements is needed, then the process flows to stage 102, wherein the controller 51 brings any dropped loads back online, and then loops to stage 101. If it is determined that the operator is attempting to drive the machine through the parking brake 56 in first gear but that no torque increase to the ground engaging elements is needed, then the process loops to stage 101.

Otherwise, if it is determined at stage 101 that the operator is attempting to drive the machine through the parking brake 56 in first gear and that a torque increase to the ground engaging elements is needed, the process 100 flows to stage 103. At stage 103, the controller 51 selects a load ($Load_n$) from a load list and drops the selected $Load_n$. In an embodiment, the load list is an ordered list of auxiliary loads to be dropped in order. For example, less important loads may be placed ahead of more important loads. Thus, an air conditioner compressor load may have a lower n in the list than a more important load such as an engine cooling fan load.

The controller 51 then determines at stage 104 whether the ground engaging elements now have sufficient torque to drive through the parking brake 56. If it is determined that the ground engaging elements now have sufficient torque to drive through the parking brake 56, then the process 100 loops back to stage 101. Otherwise, the process 100 flows from stage 104 to stage 105, wherein the controller increments n. The process 100 then returns to stage 103 to identify and drop the next load ($Load_{n+1}$). As with the process 70, the process 100 may include a waiting period or hysteresis period to avoid rapid fluctuations in a loads online status.

What is claimed is:

1. A method for enabling a machine to drive through a parking brake of the machine, the method comprising:
   detecting that a transmission of the machine is in a first gear, wherein the transmission provides a plurality of gears of consecutive respective ratios and the first gear has the lowest ratio of the plurality of gears in a selected direction;
   detecting that a parking brake of the machine is activated, such that the machine is stationary;
   detecting that a throttle setting of the machine exceeds a predetermined throttle threshold value; and
   in response to the detected gear, parking brake activation and throttle setting, withholding power from one or more auxiliary loads of the machine to provide additional torque to ground engaging elements of the machine to allow the machine to drive through the parking brake.

2. The method in accordance with claim 1, wherein the parking brake includes a parking brake actuator and a parking brake element, and wherein detecting that the parking brake of the machine is activated comprises detecting that the actuator of the parking brake has been actuated.

3. The method in accordance with claim 1, wherein detecting that the throttle setting of the machine exceeds the predetermined throttle threshold value includes detecting that a position of a user-manipulated machine throttle selector is beyond a threshold position.

4. The method in accordance with claim 1, wherein the one or more auxiliary loads of the machine include one or more of a cooling fan, an alternator, an air conditioner compressor, a hydraulic brake charging pump, a pneumatic brake charging pump and a water pump.

5. The method in accordance with claim 1, wherein withholding power from one or more auxiliary loads of the machine comprises withholding power from all auxiliary loads of the machine.

6. The method in accordance with claim 1, wherein withholding power from one or more auxiliary loads of the machine comprises withholding power from fewer than all auxiliary loads of the machine.

7. The method in accordance with claim 6, wherein withholding power from fewer than all auxiliary loads of the machine comprises withholding power from a predetermined subset of the auxiliary loads of the machine.

8. The method in accordance with claim 6, wherein withholding power from fewer than all auxiliary loads of the machine comprises consecutively withholding power from an ordered series of the auxiliary loads of the machine until the machine ground engaging elements have sufficient torque to drive through the parking brake in first gear.

9. A parking brake system for enabling a machine to drive through a parking brake of the machine, the parking brake system comprising:
   a parking brake;
   a transmission sensor configured to detect a gear of a machine transmission;
   a throttle sensor configured to detect a position of a throttle input; and
   a controller configured to detect that a transmission of the machine is in a lowest available gear in a selected direction, detect that the parking brake has been applied, detect from the throttle sensor that a throttle input to the machine exceeds a predetermined threshold value, and when the transmission of the machine is in the lowest available gear, the parking brake actuator has been applied and the throttle input to the machine exceeds the predetermined threshold value, withholding power from one or more auxiliary loads of the machine to provide additional torque to ground engaging elements of the machine to allow the machine to drive through the parking brake.

10. The parking brake system in accordance with claim 9, wherein the parking brake includes a parking brake actuator and a parking brake element, and wherein detecting that the parking brake has been applied comprises detecting that the actuator of the parking brake has been actuated.

11. The parking brake system in accordance with claim 9, wherein the throttle input includes a user-manipulated selector and wherein detecting that the throttle input exceeds the predetermined threshold position includes detecting that a position of a user-manipulated selector is beyond the threshold position.

12. The parking brake system in accordance with claim 9, wherein the one or more auxiliary loads of the machine include one or more of a cooling fan, an alternator, an air conditioner compressor, a hydraulic brake charging pump, a pneumatic brake charging pump and a water pump.

13. The parking brake system in accordance with claim 9, wherein withholding power from one or more auxiliary loads of the machine comprises withholding power from all auxiliary loads of the machine.

14. The parking brake system in accordance with claim 9, wherein withholding power from one or more auxiliary loads of the machine comprises withholding power from fewer than all auxiliary loads of the machine.

15. The parking brake system in accordance with claim 14, wherein withholding power from fewer than all auxiliary loads of the machine comprises withholding power from a predetermined subset of the auxiliary loads of the machine.

16. The parking brake system in accordance with claim 14, wherein withholding power from fewer than all auxiliary loads of the machine comprises consecutively withholding power from an ordered series of the auxiliary loads of the machine until the machine ground engaging elements have sufficient torque to drive through the parking brake in the lowest gear.

17. A machine comprising:
a parking brake;
a throttle;
a transmission having a lowest forward gear and a lowest reverse gear; and
a controller configured to detect a transmission gear, a throttle position, and a parking brake state, and to withhold power from one or more auxiliary loads of the machine upon detecting that the transmission is in one of the lowest forward gear and the lowest reverse gear, the throttle position exceeds a predetermined threshold throttle position, and the parking brake is in an applied state.

18. The machine in accordance with claim 17, wherein withholding power from one or more auxiliary loads of the machine comprises withholding power from all auxiliary loads of the machine.

19. The machine in accordance with claim 17, wherein withholding power from one or more auxiliary loads of the machine comprises withholding power from fewer than all auxiliary loads of the machine.

20. The machine in accordance with claim 17, wherein withholding power from one or more auxiliary loads of the machine comprises consecutively withholding power from an ordered series of the auxiliary loads of the machine until ground engaging elements of the machine have sufficient torque to drive through the parking brake in the lowest gear.

* * * * *